(12) United States Patent
Lapeyre et al.

(10) Patent No.: US 12,704,259 B2
(45) Date of Patent: Aug. 11, 2026

(54) BURNER IGNITER

(71) Applicant: Boil Boss, L.L.C., Harahan, LA (US)

(72) Inventors: Robert T. Lapeyre, New Orleans, LA (US); Robert S. Lapeyre, New Orleans, LA (US)

(73) Assignee: Boil Boss, L.L.C., Harahan, LA (US)

( * ) Notice: Subject to any disclaimer, the term of this patent is extended or adjusted under 35 U.S.C. 154(b) by 697 days.

(21) Appl. No.: 18/092,721

(22) Filed: Jan. 3, 2023

(65) Prior Publication Data

US 2024/0219025 A1 Jul. 4, 2024

(51) Int. Cl.
*F23Q 3/00* (2006.01)
*A47J 37/07* (2006.01)
*F23Q 21/00* (2006.01)

(52) U.S. Cl.
CPC .......... *F23Q 3/008* (2013.01); *A47J 37/0763* (2013.01); *F23Q 3/006* (2013.01); *F23Q 21/00* (2013.01)

(58) Field of Classification Search
CPC ........... F23Q 3/008; F23Q 3/006; F23Q 21/00
See application file for complete search history.

(56) References Cited

U.S. PATENT DOCUMENTS 1,043,759 A * 11/1912 Fisher ................ H01R 13/7036 200/51.09
1,526,366 A * 2/1925 Old ......................... F23Q 3/006 338/184
1,897,310 A * 2/1933 Kiefer ................... F23D 11/001 431/265
3,598,941 A * 8/1971 Nelson ............... H01R 13/7036 200/51.09
3,778,569 A * 12/1973 Newman ............ H01R 13/7036 200/51.09
4,288,210 A 9/1981 Leonard et al.
4,406,615 A * 9/1983 Guerra ...................... F23Q 9/00 431/278
4,791,734 A * 12/1988 Wojtkowiak ............ F23Q 3/006 431/264

(Continued)

FOREIGN PATENT DOCUMENTS

CN 212252702 U * 12/2020
CN 113245689 A * 8/2021 ............ F23Q 21/00

(Continued)

OTHER PUBLICATIONS

Loco Cookers Owners Manual Assembly Instructions, Loco-Crazy Good Cookers, LLC, Columbus, Georgia, Jun. 25, 2020.

*Primary Examiner* — Jorge A Pereiro
(74) *Attorney, Agent, or Firm* — James T. Cronvich

(57) ABSTRACT

An igniter for a burner in a cooking system. The igniter comprises a spark unit including two electrodes that define a spark gap, a spark module electrically connected to the electrodes to apply a high-voltage pulse across the electrodes to generate a spark in the spark gap, and a remote sending unit that sends an ignite signal to the spark module to generate a spark in the spark gap to light the burner. A local ignite signal can be initiated from the spark module. The spark module and the remote sending unit can be clamped to a gas hose supplying gas to the burner. The spark unit can be attached to a variety of burners by attachments to position the spark gap in the burner's gas flow. A single-electrode igniter is also described.

24 Claims, 9 Drawing Sheets

(56) References Cited

U.S. PATENT DOCUMENTS

| | | | | | |
|---|---|---|---|---|---|
| 4,931,907 | A * | 6/1990 | Robinson | H05K 7/1411 361/732 |
| 5,635,690 | A * | 6/1997 | Knecht | H01R 13/707 200/51.09 |
| 5,813,394 | A | 9/1998 | Clifford | |
| 5,836,756 | A | 11/1998 | Moss | |
| 5,879,176 | A * | 3/1999 | Stimson | H01R 13/7035 200/51.09 |
| 5,992,408 | A * | 11/1999 | Chen | F24C 3/14 126/45 |
| 6,112,730 | A * | 9/2000 | Marrs | F02P 23/04 123/635 |
| 6,173,709 | B1 | 1/2001 | Yokoyama | |
| 7,535,131 | B1 * | 5/2009 | Safieh, Jr. | H03K 17/955 307/134 |
| 10,219,652 | B2 | 3/2019 | Hagstrom et al. | |
| 2007/0231760 | A1 * | 10/2007 | Proffitt | F23D 14/38 431/255 |
| 2010/0313873 | A1 | 12/2010 | Zhou et al. | |
| 2013/0309619 | A1 * | 11/2013 | Tsai | F23D 14/68 137/550 |
| 2014/0377711 | A1 * | 12/2014 | Blalock | F24C 3/103 431/258 |
| 2015/0198336 | A1 * | 7/2015 | Koch | F24C 3/126 431/18 |
| 2020/0158336 | A1 * | 5/2020 | Davis | B01D 17/12 |

FOREIGN PATENT DOCUMENTS

| | | | | | |
|---|---|---|---|---|---|
| CN | 114768273 | A * | 7/2022 | F23D 11/42 |
| DE | 20203410 | U1 * | 7/2002 | F23Q 3/002 |
| EP | 2204613 | A2 * | 7/2010 | F23Q 3/00 |
| KR | 200433290 | Y1 * | 12/2006 | F23Q 7/22 |
| KR | 102194728 | B1 * | 12/2020 | F24C 3/103 |
| RU | 180424 | U1 * | 6/2018 | F23Q 21/00 |

* cited by examiner

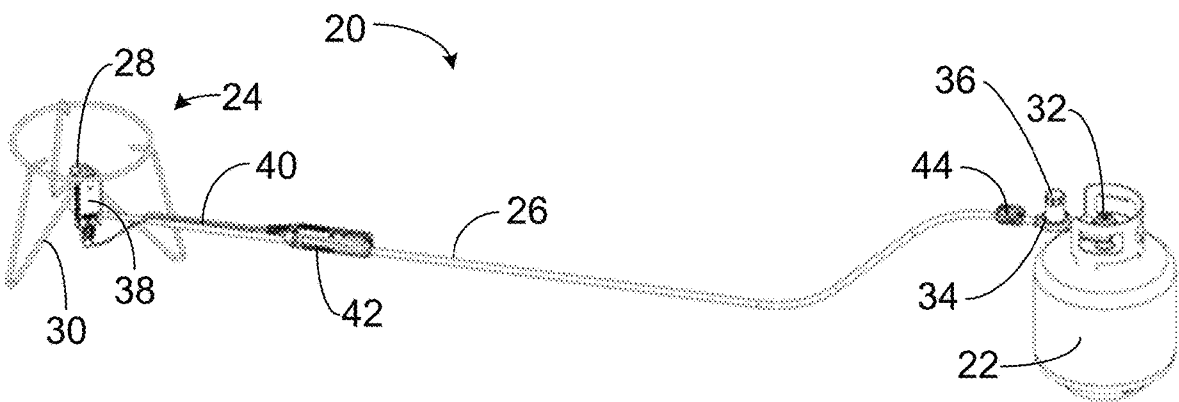
FIG. 1
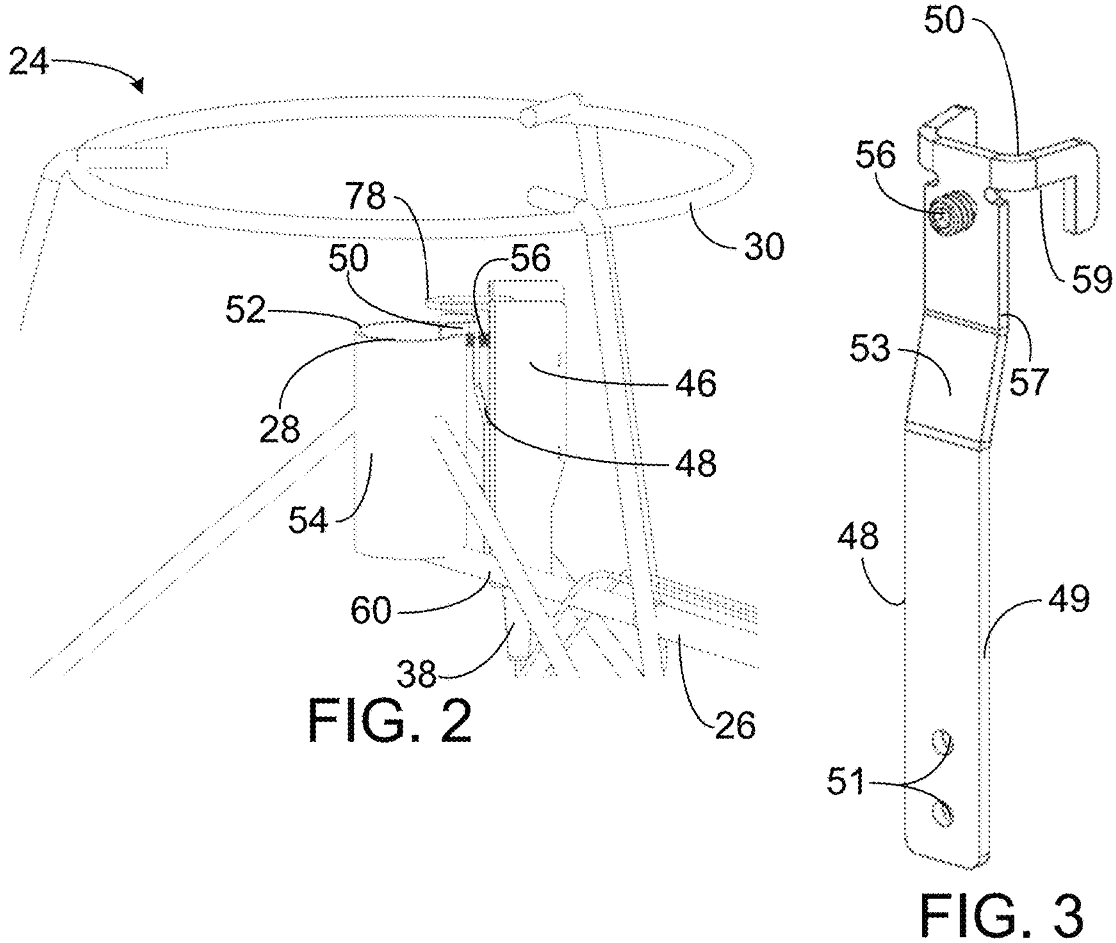
FIG. 2
FIG. 3

93
94
89
87
99
98
94
26
92
95

93
26
103
99
98
97

92
96
102
100
42
102
100
88
86
26

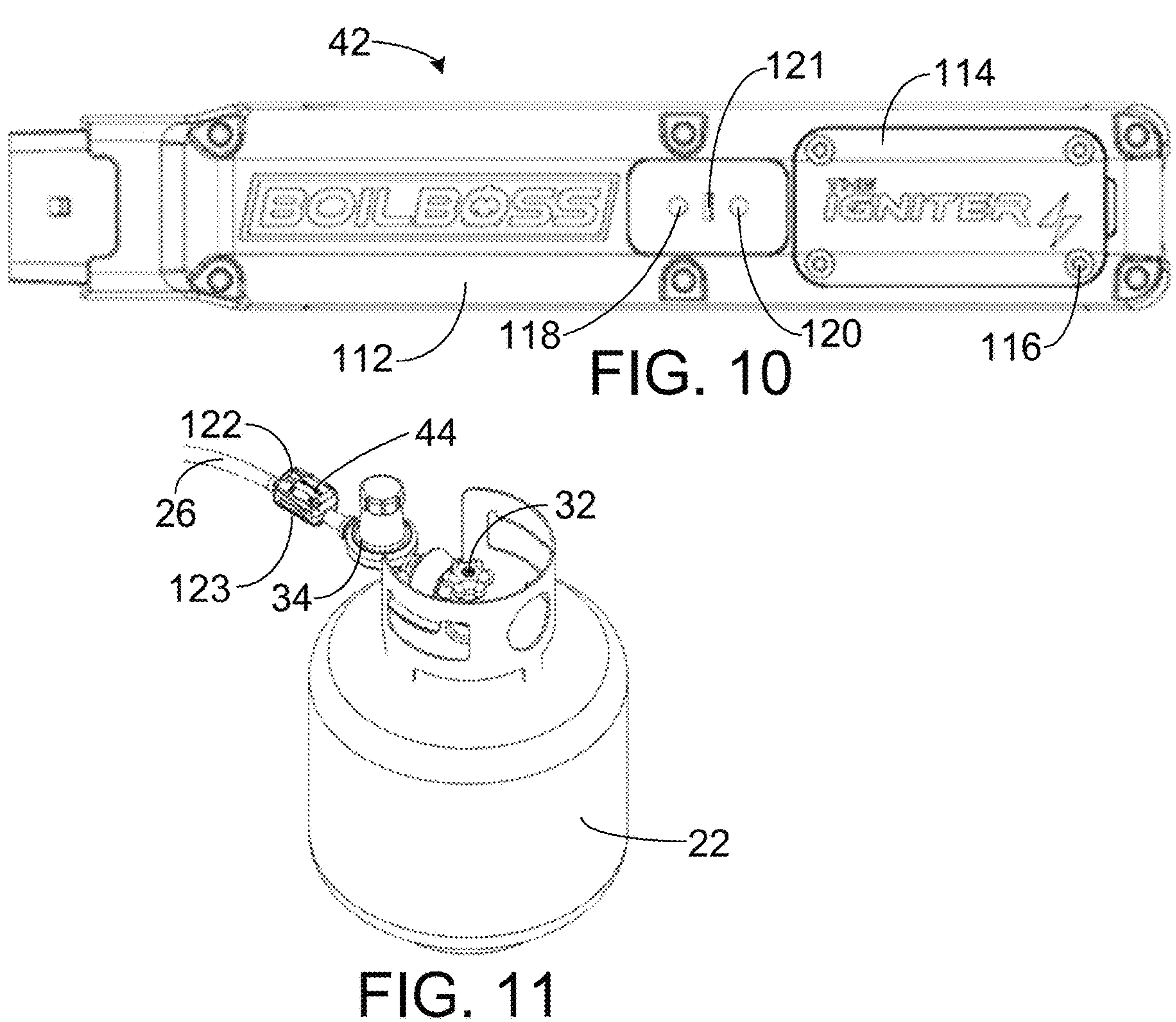
FIG. 10
FIG. 11
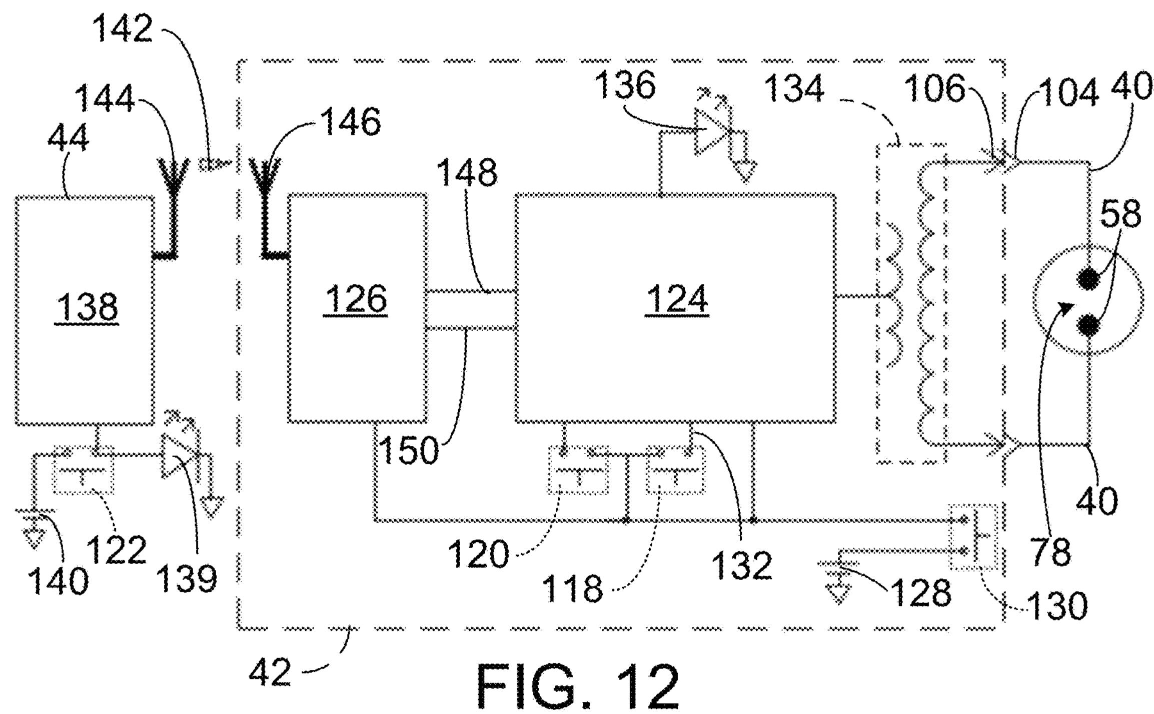
FIG. 12

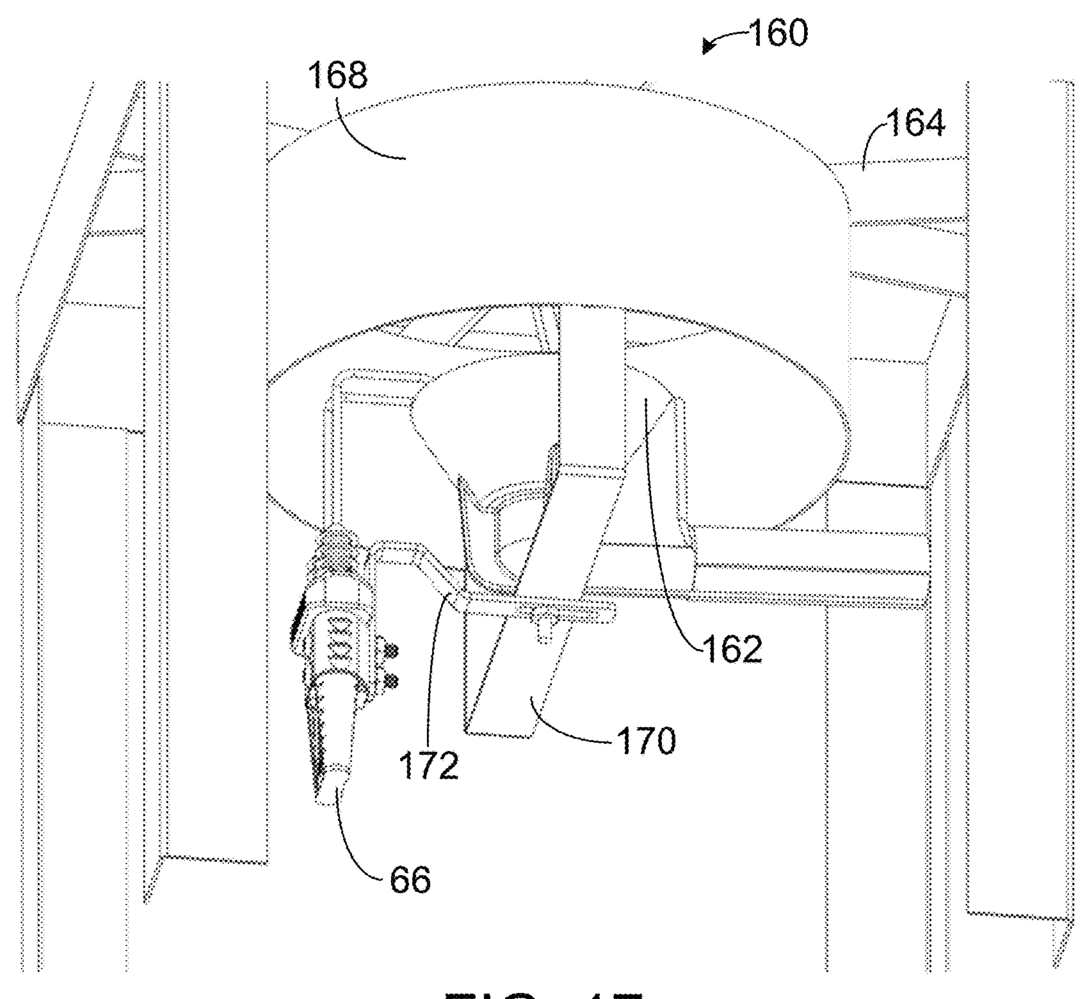
FIG. 17
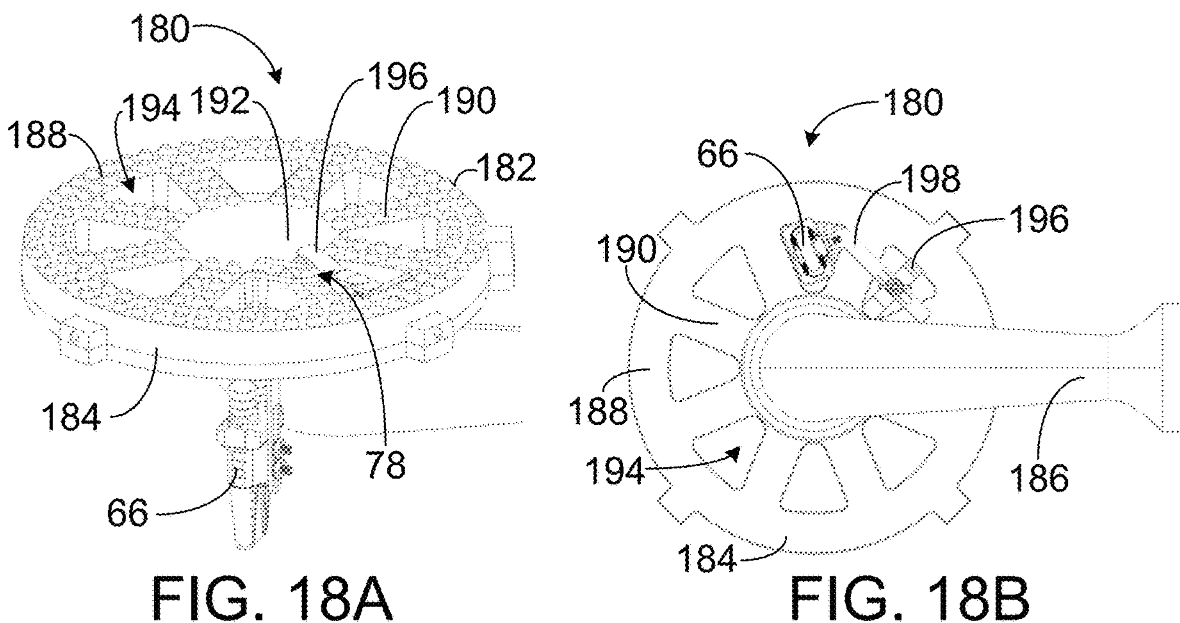
FIG. 18A
FIG. 18B

BURNER IGNITER

BACKGROUND

The invention relates generally to burners and in particular to igniters for gas burners.

Backyard chefs use propane burners to boil seafood or fry turkeys. The burners include a stand supporting a boiling or frying pot. Propane is supplied to the burner from a tank via a gas hose. A gas regulator in line with the gas hose is attached to a valve on the tank. Before the burner is ignited, the regulator is typically closed, and the valve is opened to supply propane to the regulator. Igniting the burner is usually a two-person operation: one opening the regulator to supply propane through the hose to the burner, the other inserting a handheld lighter or a lit match into the propane flow at the burner's outlet to ignite a flame. If the regulator is opened too much, the propane flow at the outlet can be so great that it extinguishes the match's flame. Or if the burner does light, the flame can initially whoosh outward and singe the hand holding the match or lighter. Another problem is caused by wind—even light breezes—that can blow out the match flame before the burner is ignited. And sometimes matches are not available, or the lighter is empty of fuel.

SUMMARY

One version of an igniter embodying features of the invention comprises a spark module, a spark unit, and a sending unit. The spark unit includes at least one electrode having a distal end. The at least one electrode is electrically connected to the spark module. The sending unit is remote from the spark module and has an actuator. When actuated, the actuator causes the sending unit to send an ignite signal to the spark module to send a high-voltage pulse to the at least one electrode to generate a spark at the distal end.

Another igniter version comprises a spark module and a spark unit including at least one electrode having a distal end. The spark module includes a high-voltage pulse generator connected to the at least one electrode, a clamp suitable for clamping the spark module to a gas hose, and a sending unit that includes an actuator. When actuated, the actuator causes the sending unit to send an ignite signal to the high-voltage pulse generator to send a high-voltage to the at least one electrode to generate a spark at the distal end.

A spark unit embodying features of the invention comprises a first ceramic insulator and a second ceramic insulator. A first electrode extends from the second end of the first ceramic insulator to a distal end, and a second electrode extends from the second end of the second ceramic insulator to a distal end. A bridge extends from the first ceramic insulator to the second ceramic insulator between the first and second ends to fix the spacing between the first and second ceramic insulators. The bridge has a top that angles downward and outward to allow fluids to drain off. The distal ends of the first and second electrodes converge toward each other to form a spark gap between themselves.

A cooking system embodying features of the invention comprises a burner having a gas outlet, a gas hose carrying gas to the burner, and an igniter. The igniter includes a spark module and a spark unit attached to the burner and having at least one electrode with a distal end at the gas outlet of the burner. The spark module includes a high-voltage pulse generator electrically connected to the at least one electrode. The high-voltage pulse generator sends a high-voltage pulse to the at least one electrode to generate a spark that ignites the gas flowing through the outlet. A clamp clamps the spark module around the gas hose.

BRIEF DESCRIPTION OF THE DRAWINGS

FIG. 1 is a pictorial view of one version of a cooking system with an igniter embodying features of the invention.

FIG. 2 is a pictorial view of a portion of the burner of the cooking system of FIG. 1.

FIG. 3 is an enlarged isometric view of the mounting bracket of FIG. 2.

FIG. 10 is a top plan view of the spark module of FIG. 5.

FIG. 11 is a pictorial view of the propane tank with a regulator and a remote sending unit as in the cooking system of FIG. 1.

FIG. 12 is a block diagram of one version of an electrical system usable in the igniter of FIG. 1.

FIG. 17 is a bottom pictorial view of another version of a burner using the spark unit of FIG. 4B.

FIGS. 18A and 18B are pictorial and bottom plan views of yet another version of a burner using the spark unit of FIG. 4B.

DETAILED DESCRIPTION

Figure 4A:
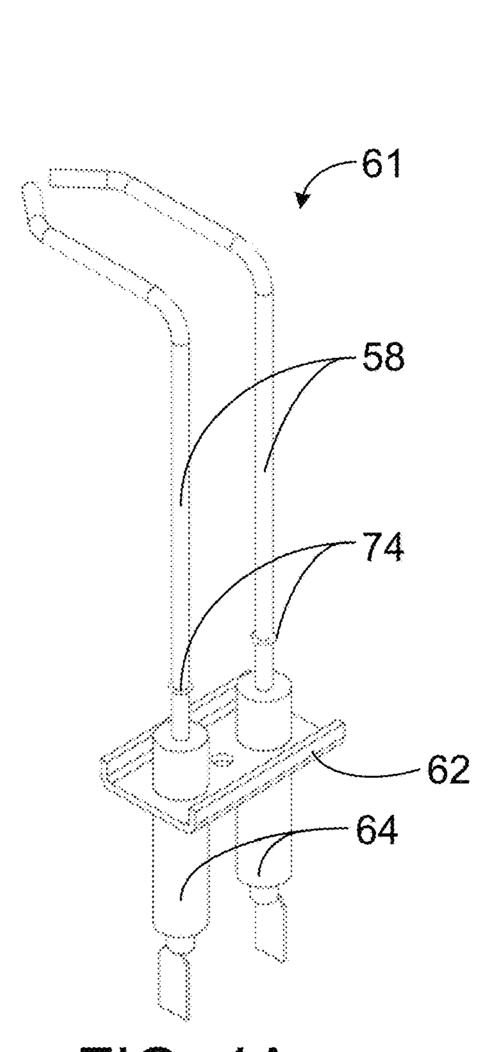
FIG. 4A is a pictorial view of electrodes in a spark unit of the igniter of FIG. 1.

An outdoor cooking system embodying features of the invention is shown in FIG. 1. The cooking system 20 has a gas tank 22 supplying a gas, such as propane, to a jet burner 24 and a gas hose 26. The burner 24 includes a burner outlet 28 and a stand 30 for supporting a cooking pot (not shown). The gas tank 22 has a valve 32 at the top to which a regulator 34 is connected. The regulator 34 is connected in line with the gas hose 26. The regulator 34 has a knob 36 for manual adjustment of the gas flow through the hose 26. An igniter comprises a spark unit 38, a spark module 42, and a remote sending unit 44. The spark unit 38, including two electrodes, is attached to the burner 24. The electrodes extend into the flow of gas at the burner outlet 28. The spark unit 38 includes a pair of wires 40 that electrically connect the electrodes to the spark module 42 clamped to the gas hose 26. The spark module 42 applies a high-voltage pulse across the electrodes that produces an arc, or spark, at the burner outlet 28 to ignite the gas. The spark can be initiated by a pushbutton on the spark unit 38 or remotely from the remote sending unit 44 attached to the gas hose 26 or otherwise located remote from the spark module 42.

FIG. 2 shows the attachment of the spark unit 38 to the jet burner 24. The spark unit 38 is attached to one side of a heat shield 46. A mounting bracket 48, shown enlarged in FIG. 3, has a lower segment 49 attached by bolts or screws through two through holes 51 to the opposite side of the heat shield 46. The bracket 48 has a two-pronged hook 50 at a top end that hooks over the rim 52 of a burner pipe 54 at the burner outlet 28. A bolt, screw, or set screw 56 through the heat shield 46 and threaded through an upper segment 57 of the bracket 48 is tightened against the outer periphery of the burner pipe 54 to clamp the pipe to the heat shield. If the heat shield 46 is not required, the spark unit 38 is attached directly to the bracket 48. Arms 59 of the hook 50 rest on the rim 52 of the burner pipe 54 to register the spark unit 38 with the spark gap 78 at the proper level above the rim. The set screw 56 tightens against the periphery of the burner pipe 54 to set the extension of the electrodes 58 into the gas flow exiting the burner pipe 54 at the outlet 28. The lower and upper segments 49, 57 of the bracket 48 are offset from each other by an intermediate segment 53 obliquely joined to them. The offset spaces the lower segment 49 fastened to the spark unit 38 farther away from the hot burner pipe 54. Gas is fed to the burner 24 at the bottom of the pipe 54 through a tube 60 connected to the gas hose 26.

Figure 4B:
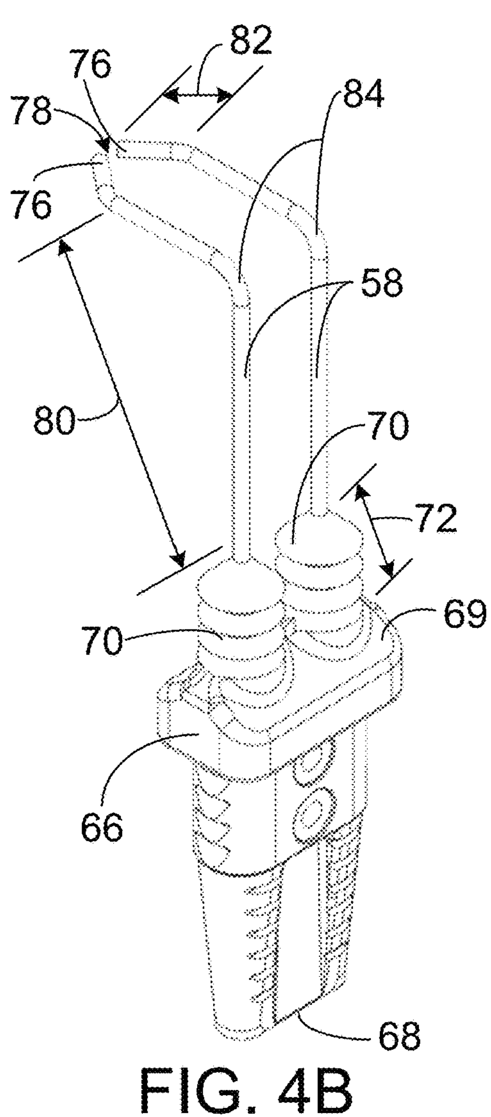
FIG. 4B is a pictorial view of the electrodes of FIG. 4A encapsulated in a waterproof housing.

Details of the electrodes 58 are shown in FIG. 4A. In this version an electrode assembly 61 comprises a pair of electrodes 58 constituting two conductors passing through a metal base 62. Ceramic bushings 64 around the electrodes 58 where they pass through the base 62 insulate the electrodes from the base. The base 62 forms a bridge holding the two bushings 62 and the two electrodes 58 in parallel. The electrode assembly of FIG. 4A is encapsulated in an electrically non-conductive, waterproof housing 66 overmolded onto the electrode assembly as shown in FIG. 4B. The housing 66 extends from a first end 68 to an opposite second end 69. Insulating spacers 70, which are integrally molded with the overmolded housing 66, encapsulate the electrodes 58 along a length 72 of the electrodes that extends from the second end of the housing 66. The insulating spacers 70 prevent liquids from pooling on the second end 69 of the housing 66 and from leaking into the interior of the housing 66 and into the bores of the ceramic bushings 64 when the spark unit is mounted second side up. The conical shape of the insulating spacers 70 helps divert liquids away from the housing 66. Thus, the insulating spacers 70 help prevent shorting and unwanted arcing between the two electrodes 58. The housing 66 and the spacers 70 are molded of a silicon-based polymer, for example.

O-rings 74 (FIG. 4A) around the electrodes 58 within the housing 66 provide additional waterproofing of the housing's interior by providing a tight seal against the electrodes. The overmolded housing 66 bonds to the O-rings 74 during the overmolding process. When the housing material cools and shrinks, the O-rings 74 are squeezed tight against the electrodes 58. The electrodes 58 extend out of the housing 66 to distal ends 76 spaced apart across a spark gap 78. In this version the two electrodes 58 are parallel to each other along a first length 80 that extends from the insulating spacers 70. The electrodes 58 converge toward each other along a second length 82 out to the distal ends 76. The electrodes 58 include a bend 84 in the first length 80 to extend the spark gap 78 into the burner's gas flow. The wires (40, FIG. 1) attach to the electrode assembly 61 at the first end 68 of the electrode housing 66.

Figure 5:
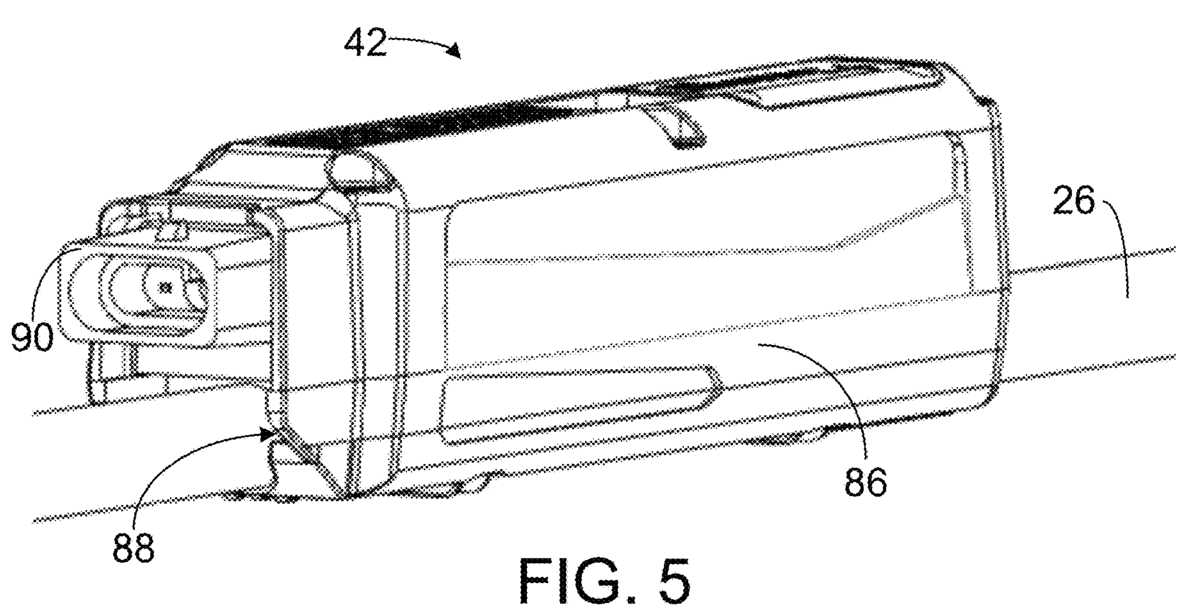
FIG. 5 is a pictorial view of a spark module of the igniter of FIG. 1.

The spark module 42 is housed in an enclosure 86 that is clamped around the gas hose 26 as shown in FIG. 5. A channel 88 extends lengthwise through the enclosure 86. A connector 90 at the end of the spark module's enclosure 90 closer to the spark unit mates with a connector (not shown) terminating the spark unit's electrode wires (40, FIG. 1).

Figures 6A, 6B, 7:
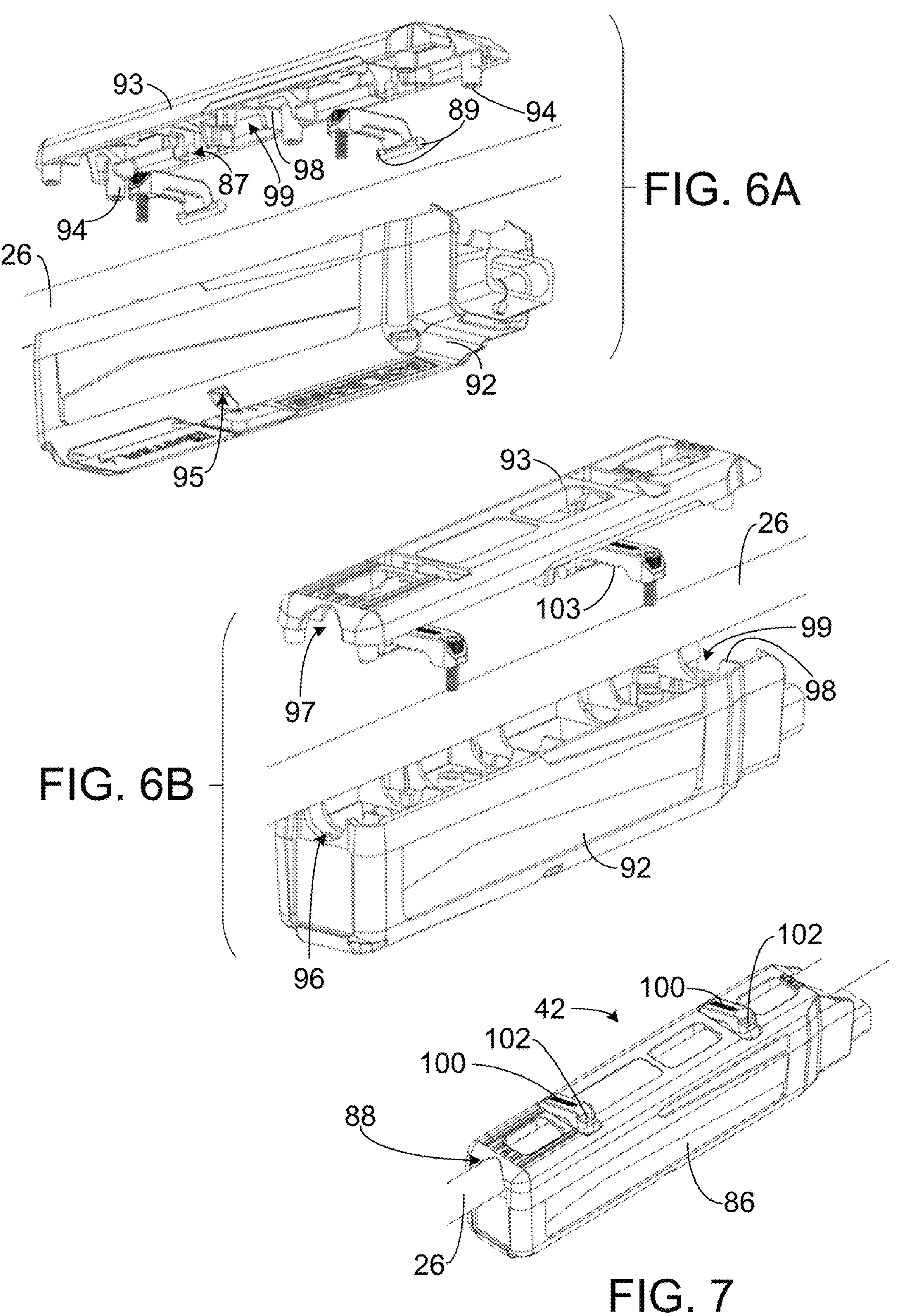
FIGS. 6A and 6B are exploded views of the spark module of FIG. 5 from two perspectives.
FIG. 7 is an isometric view of the spark module of FIG. 5 from a bottom perspective.

The spark-module enclosure 86 is attached to the gas hose 26 as shown in FIGS. 6A, 6B, and 7. First, the enclosure is separated into a first enclosure portion 92 and a second enclosure portion 93 by removing screws threaded into screw bosses 94 in the second enclosure portion 93 through screw holes 95 in the first enclosure portion 92. The first and second enclosure portions 92, 93 form first and second channel portions 96, 97. A series of plates 98 extending across the width of the first and second enclosure portions 92, 93 have semicircular cutouts 99 that define a first channel portion in the first enclosure portion 92 and a second channel potion in the second enclosures portion 93. Second, the first and second enclosure portions 92, 93 are positioned on the gas hose 26 so that it is received in the first and second channel portions 96, 97. The screw bosses 94 are aligned with the screw holes 95, and the first and second enclosure portions 92, 93 are pushed together with the hose 26 received in the resulting channel 88. Screws (not shown) are then threaded into the screw bosses 94 in the second enclosure portion 93 through the screw holes 95 in the first enclosure portion 92. The diameter of the channel 88 is greater than the diameter of the gas hose 26 so that the closed enclosure 86 can be rotated around the hose and slid along its length to the preferred operating position anywhere along the length of the hose. When the enclosure 86 is in a desired orientation, such as with the first enclosure portion 92 facing upward, clamps 100 having trunnions 89 pivotably retained in slots 87 in the second enclosure portion 93 are screwed down with screws 102 to clamp the gas hose 26 in the channel 88 against the first enclosure portion 92. In that way the spark module 42 is affixed to the gas hose 26 in a convenient orientation. The clamps 100 have serrations 103 that firmly grip the gas hose 26 when the clamps are closed.

Figures 21A, 21B, 22, 23:
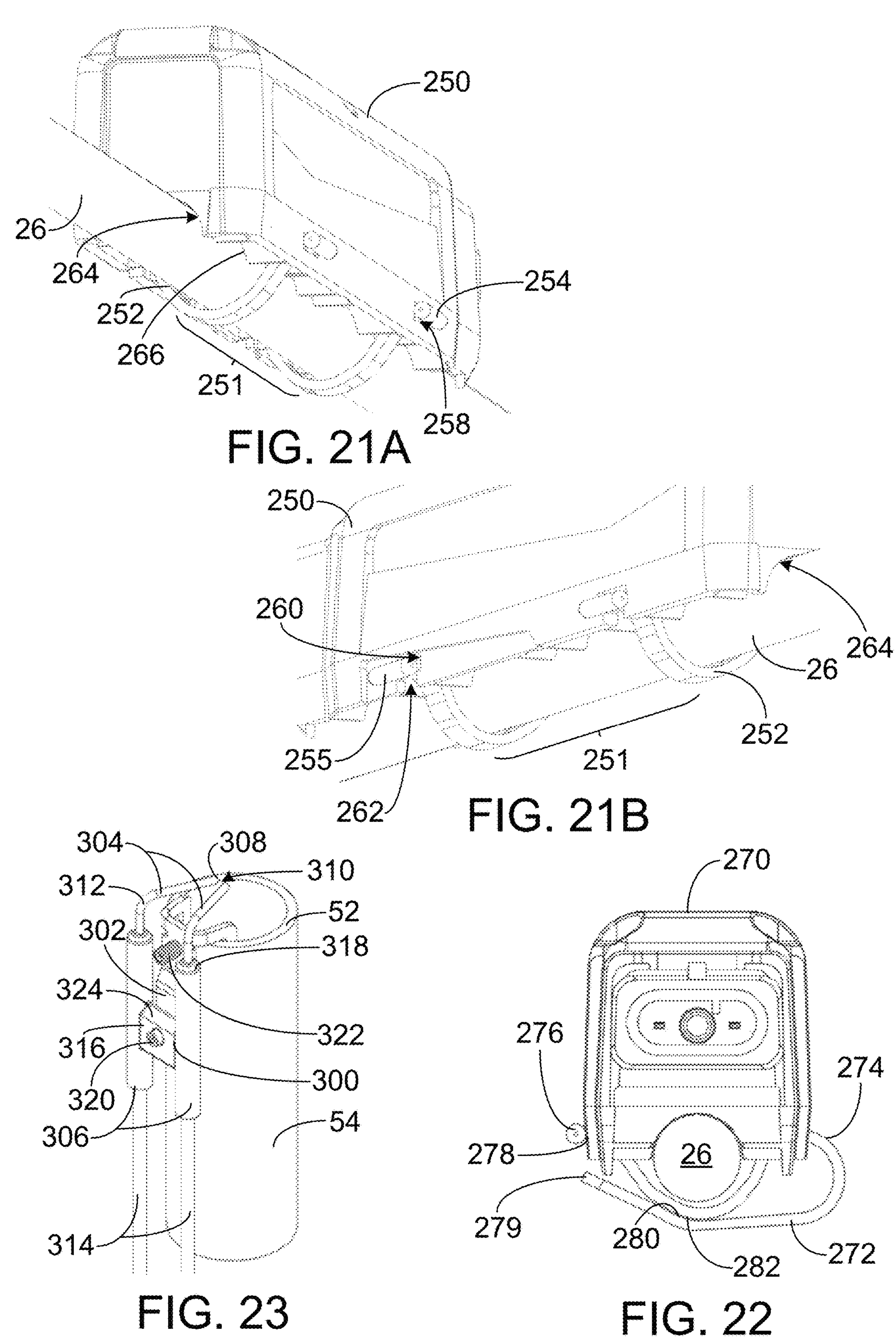
FIGS. 21A and 21B are isometric views of a spark module with a flexible-band fastener.
FIG. 22 is a front elevation view of a spark module with a hook-and-loop strap fastener.
FIG. 23 is an isometric view of another version of an electrode assembly fastened to a burner pipe.

Other fasteners, besides the clamps 100 of FIG. 7, can be used to attach the spark module to the gas hose. As one example, FIGS. 21A and 21B show a spark module 250 with an elastic-band fastener 251. The fastener 251 comprises one or more elastic bands 252 that terminate in bars 254, 255 at each end. In this example, the fastener 251 uses two elastic bands 252. One side of a spark module 250 has closed slots 258 that receive the bars 254. The slots 258 are shorter in length than the bars 254, but wider than the diameter of the bars to form a toggle-clasp connection. The bars 255 at the other end of the band 252 are received in slots 260 having openings 262 on one side to facilitate insertion and removal of the bars 255. The flexible bands 252 dangle from the closed slots 254 when the spark module 250 is not attached to the gas hose 26. To attach the spark module 250 to the gas hose 26, the spark module is positioned on the gas hose so that the hose is received in a channel 264 formed by semicircular cutouts 266 in the bottom of the spark module. The elastic bands 252 are then stretched around the gas hose 26, and the bars 255 at the dangling ends of the bands are hooked into the open slots 260 through the openings 262. The stretched elastic bands tightly fasten the spark module 250 to the gas hose 26.

Another example of a fastener is shown in FIG. 22. In this version, a spark module 270 is attached to the gas hose 26 by a hook-and-loop strap fastener 272. The fastener 272 comprises one or more straps 274. Each strap 274 has a bar 276 at one end 278 that is received in a slot on one side of the spark module 270 (not shown, but the same as the closed slots 258 in FIG. 21A). When the spark module 270 is not mounted to the gas hose 26, the other end 279 of the strap 274 dangles freely from the side of the spark module 270 to which the bar 276 is clasped. To attach the spark module 270 to the gas hose 26, the spark module is first positioned on the hose as described for the spark module 250 of FIGS. 21A and 21B. Then the free end 279 of the strap 274 is threaded around the gas hose 26 and through a similar closed slot (not shown) on the other side of the spark module and doubled back below itself and the hose. The strap 274 is pulled tight around the gas hose 26. The tightened strap 274 is then contacted to itself. Loops 280 on the strap 274 toward the free end 279 are held firmly by hooks 282 on the strap toward the bar end 278 to fasten the spark module 270 to the gas hose 26.

Figure 8:
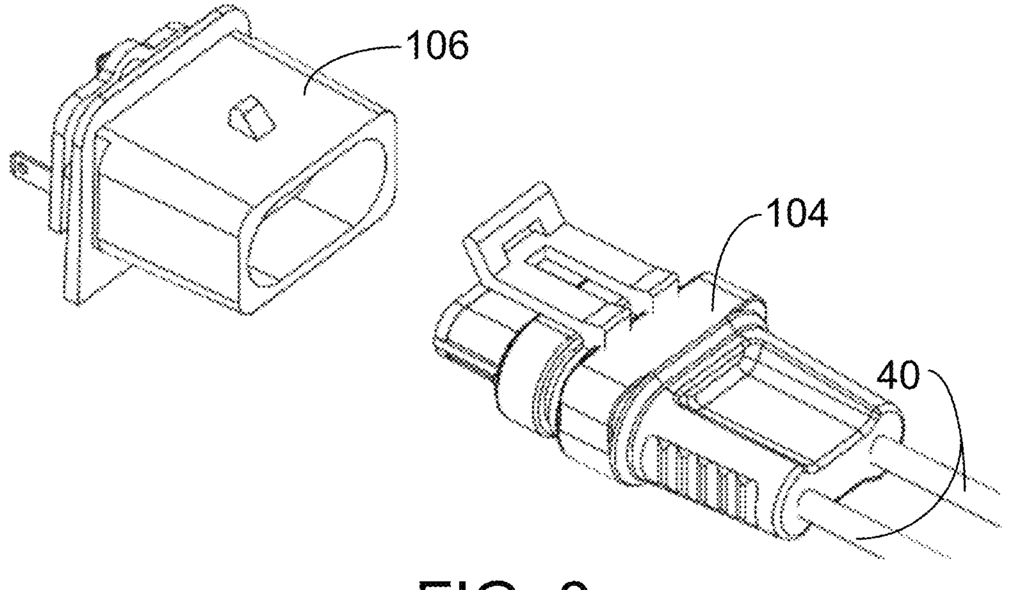
FIG. 8 is an isometric view of the mating connectors of the spark unit and the spark module of the igniter of FIG. 1.
Figure 9:
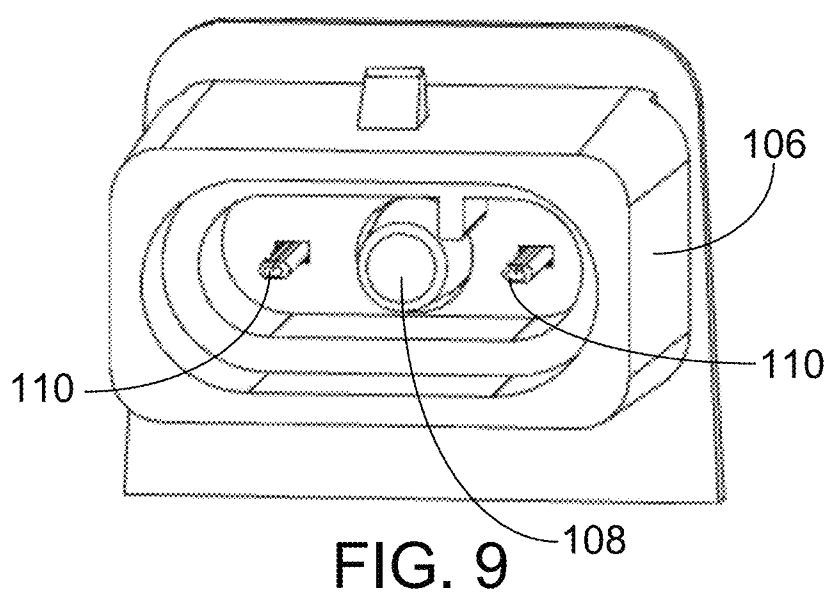
FIG. 9 is an enlarged view of the spark-module connector.

As previously mentioned, the wires 40 from the electrodes terminate in a first connector 104 as shown in FIG. 8. A second connector 106 at an end of the spark module mates with the first connector 104 to electrically connect the spark module to the electrodes. As shown in FIG. 9, the second connector 106 on the spark module has a safety pushbutton 108. When the two connectors 104, 106 are mated to connect the spark module to the electrodes, the first connector depresses the safety pushbutton 108, which closes a safety switch to connect power to the spark module. When the connectors 104, 106 are not mated and the safety pushbutton 108 is released, the safety switch opens to disconnect power to the spark module and prevent high voltages from appearing on the uncovered pins 110 of the second connector 106.

The top face 112 of the spark unit 42 is on the first enclosure portion as shown in FIG. 10. A battery cover 114 held in place with screws 116 covers an opening in the top face 112 leading to a battery cavity. The top face 112 also includes two pushbutton switches 118, 120 covered by a labeled overlay with a domed pushbutton for each switch. The first pushbutton 118 is an ignite pushbutton that, when depressed, causes the spark module 42 to apply a high-voltage pulse across the electrodes to generate a spark in the spark gap. The second pushbutton 120 is a receiver on/off pushbutton that, when depressed for a predetermined period, e.g., five seconds, enables a disabled receiver or disables an enabled receiver in the spark module 42. An LED window 121 in the top face 112 displays light from an LED that indicates various conditions.

FIG. 11 shows the remote sending unit 44 attached to the gas hose 26 near the regulator 34 attached to the valve 32 on the propane tank 22. Like the spark module, the remote sending unit 44 has two enclosure portions 122, 123 that can be closed around the hose 26. Of course, the remote sending unit 44 can be unattached to the hose 26 and used anywhere within range of the receiver in the spark module.

A block diagram of the electrical system of the igniter is shown in FIG. 12. Electronic circuitry 124 in the spark module 42 includes a microcontroller and memory, a dc-to-ac converter as part of a high-voltage pulse generator, and ancillary circuit components. The spark module 42 also includes a receiver 126, such as a radio receiver, to receive ignite signals from the remote sending unit 44. The receiver 126 and the electronic circuitry 124 reside in the first enclosure portion and can be potted for durability and waterproofing.

The spark module 42 is powered over a power line by a battery 128, such as a 3-volt cell, through a normally-open safety switch 130. Only when the two mating connectors 104, 106 are mated and depressing the safety pushbutton (108, FIG. 8) does the safety switch 130 close the power line to apply power to the spark module 42. Alternatively, the safety pushbutton can be replaced by a sensor in the spark module 42 that is always connected to the battery 128. When the sensor detects that the connectors 104, 106 are mated, it closes the safety switch 130 to close the power line and apply power to the rest of the spark module 42; otherwise the safety switch is open, unpowering the rest of the spark module. When the module 42 is powered and the ignite pushbutton actuator 118 is depressed, a local ignite signal 132 is sent to the microcontroller in the electronic circuitry 124. Upon receiving the ignite signal 132, the microcontroller commands the high-voltage pulse generator to output a high-voltage pulse via a step-up transformer 134 through the connectors 106, 104 and the electrode wires 40 to the electrodes 58. The high-voltage pulse is of short duration, e.g., 0.25 seconds, and repeats periodically as long as the ignite pushbutton 118 is depressed. An LED 136 turns on while the ignite pushbutton is depressed, its light is conducted to the LED window (121, FIG. 10) by a clear plastic light pipe between the LED and the window at the top face of the enclosure.

A remote ignite signal can be transmitted to the spark unit 42 from the remote sending unit 44. The remote sending unit 44 has a transmitter 138, such as a radio transmitter, powered by a battery 140 through its remote ignite pushbutton 122. When depressed, the remote ignite pushbutton actuator 122 applies power to the transmitter 138, which transmits a wireless ignite signal 142 over an antenna 144 in the remote sending unit. Alternatively, the remote sending unit 44 can be hardwired to the spark module 42, and an ignite signal can be transmitted by wire. At the same time, an indicator LED 139 is illuminated. If the receiver 126 in the spark module 42 has been enabled by the receiver on/off pushbutton 120, the receiver receives the transmitted ignite signal 142 over its antenna 146 and sends a remote ignite signal 148 to the microcontroller to command the high-voltage pulse generator to apply a high-voltage pulse across the electrodes 58 to generate a spark in the spark gap 78. The microcontroller enables and disables the receiver 126 in response to depressions of the receiver on/off pushbutton 120 via a receiver enable/disable signal 150. The spark unit's LED 136 flashes when the microcontroller detects that the receiver on/off pushbutton 120 has been depressed for the predetermined period required to enable and disable the receiver 126. Thus, sparking can be actuated by a remote ignite signal 148 from the remote sending unit 44 or by a local ignite signal 132 from the ignite pushbutton 118 serving as a local sending unit.

Figures 13, 14, 15, 16:
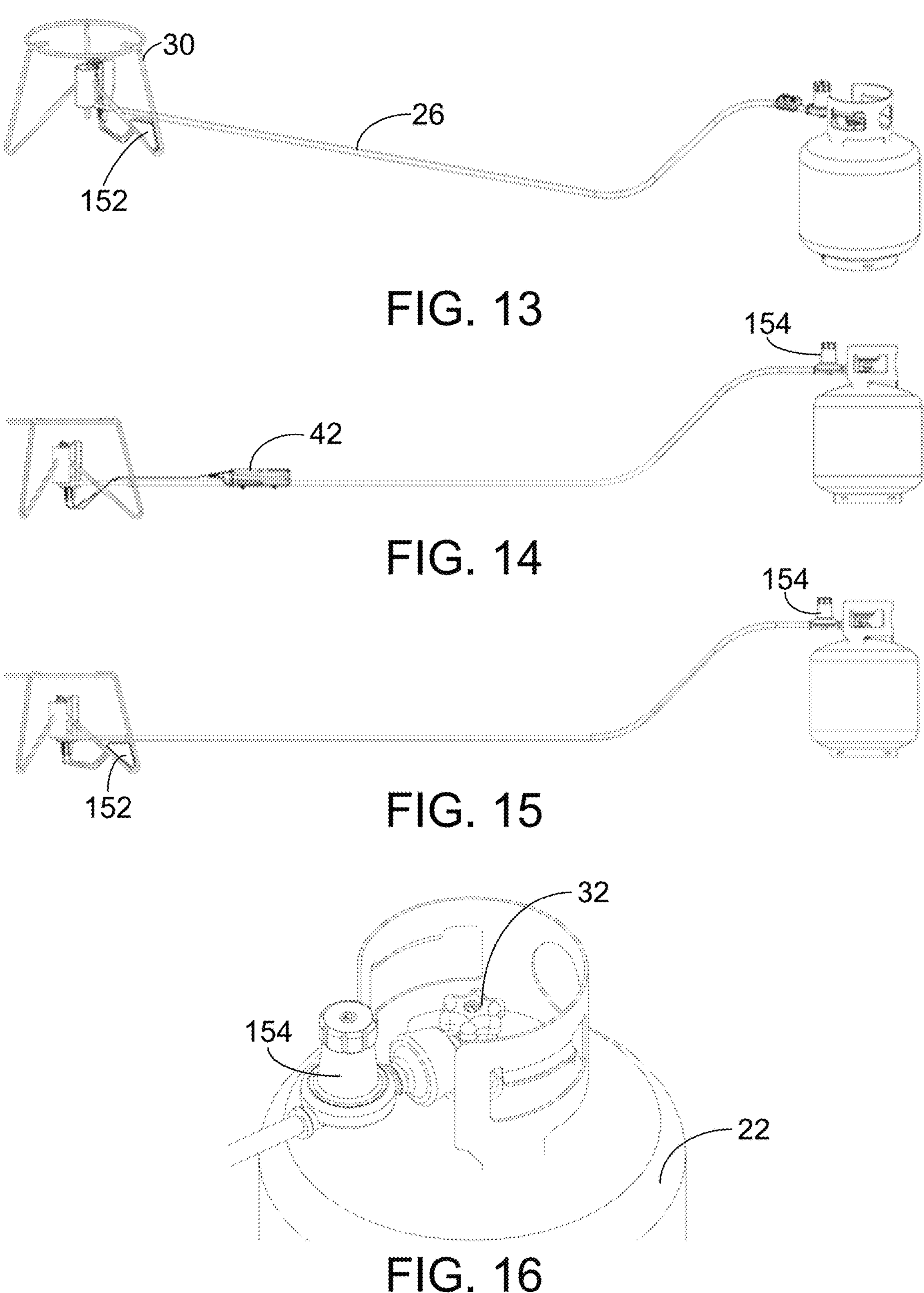
FIG. 13 is a pictorial view of another version of an igniter.
FIG. 14 is a side elevation view of yet another version of an igniter.
FIG. 15 is a side elevation view of still another version of an igniter.
FIG. 16 is an enlarged view of a regulator as part of an igniter embodying features of the invention.

FIGS. 13-15 show other versions of cooking systems. In FIG. 13, the only difference from the cooking system of FIG. 1 is that a spark module 152 is mounted, not to the gas hose 26, but to the burner support frame 30 in one of the legs. The version in FIG. 14 shows the hose-attached spark module 42 with a remote sending unit unitarily formed with a regulator as shown in FIG. 16. The combined remote sending-regulator unit 154 connects to the valve 32 on the tank 22. The cooking system of FIG. 15 combines the remote sending-regulator unit 154 with the burner-mounted spark module 152.

A different kind of burner is shown in FIG. 17. The burner 160 has an inverted conical pipe 162 producing a broad flame that heats a pot placed on supports 164 above the pipe's outlet 166. A shroud 168 confines the flame to the working area. A U-shaped bracket 170 extends down from the shroud 168. The spark unit's housing 66 is bolted to one end of a bracket 172 whose other end is bolted to the base of the U-shaped bracket 170. A slot in the bracket 172 allows the spark gap to be positioned in the outlet of the conical pipe as intended before the bolt is tightened.

FIGS. 18A and 18B show a burner 180 with multiple burner nozzles 182 through which gas flows from a manifold 184. Gas is supplied to the manifold 184 through a gas tube 186. The manifold has an outer circular section 188 with spokes 190 leading to a hub 192. Triangular openings 194 are formed between the spokes 190. A first bracket 196 on the upper side of the burner 180 spans one of the triangular openings 194 from the vertex nearest the hub 192 to its opposite base. A second bracket 198 on the bottom side of the burner 180 is bolted to the first bracket 196 through the opening 194. The two brackets 196, 198 are perpendicular or oblique to each other. The other end of the second bracket 193 is attached to the spark unit's housing 66. A slot 199 in the second bracket 198 allows for adjustment of the position of the spark gap 78 over the burner 180 before tightening.

Another version of a two-electrode spark unit is shown in FIG. 23. The spark unit 300 is attached to a mounting bracket 302 that hooks to the rim 52 of the burner pipe 54. Two electrodes 304 are parallel to each other along a first length that extends from a pair of associated ceramic insulators 306. The electrodes 304 converge toward each other along a second length out to their distal ends 308 to form a spark gap 310 between them. The electrodes 304 include a bend 312 in the first length to extend the spark gap 310 into the burner's gas flow. Wires 314 attach to the electrodes 304. A ceramic bridge 316 attached to both the ceramic insulators 306 between their two ends forms an H shape with the insulators and sets the spacing between the insulators. Upper ends 318 of the insulators 306 are domed to shed liquids. The spark unit 300 is attached to the mounting bracket 302 with a fastener 320, such as a bolt or screw through the bridge 316. A set screw 322 threaded through the mounting bracket 302 is used to set the extension of the electrodes 304 and the positioning of the spark gap 310 into the gas flow exiting the burner pipe 54. And the top 324 of the bridge 316 is angled away downward of the burner pipe 54 to allow fluids to drain off. Unlike the spark unit shown in FIG. 4B, the spark unit 300 is not enclosed in a housing.

Figures 19, 20:
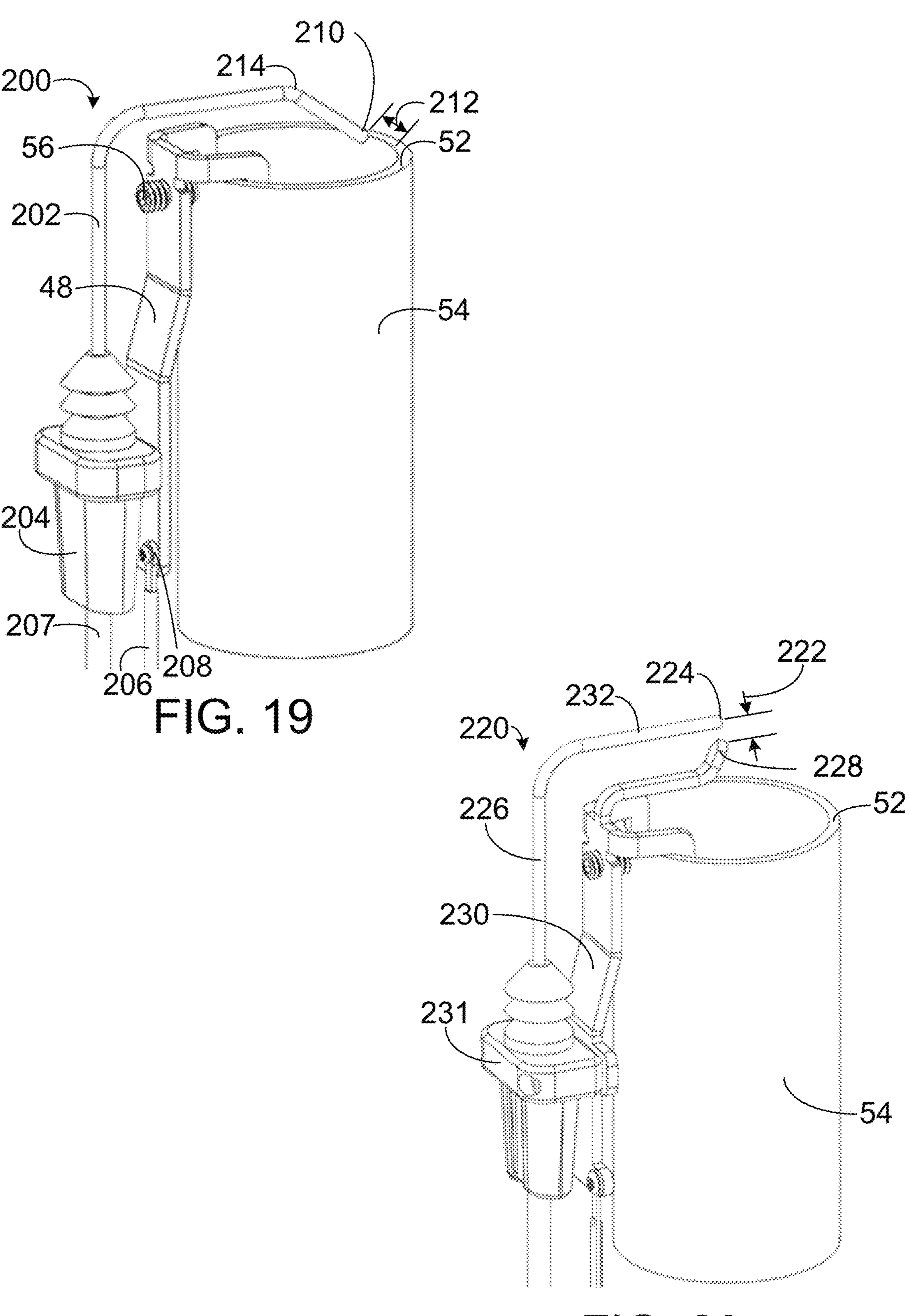
FIG. 19 is a pictorial view of a single-electrode spark unit attached to a jet burner.
FIG. 20 is a pictorial view of another single-electrode spark unit attached to a jet burner.

A single-electrode spark unit 200 is shown attached to the burner pipe 54 of a jet burner in FIG. 19. The bracket 48 and the set screw 56 are the same as for the two-electrode spark unit 38 of FIG. 2. The single-electrode spark unit 200 is shown connected directly to the bracket 48 with an intervening heat shield as in FIG. 2 for the two-electrode spark unit. But both spark units can be used with or without a heat shield. The single electrode 202 is encapsulated in an overmolded electrode housing 204. Besides encapsulating only one electrode 202, the housing 204 differs from the two-electrode housing 66 of FIG. 4B in that one of the two wires 206, 207 from the spark module does not terminate inside the housing. While the wire 207 electrically connects to the electrode 202 in the spark unit, the other wire 206 terminates in a fastener screwed to the bracket 48 to make an electrical connection between the spark module and the burner pipe through the physical connection to the bracket. The single electrode 202 extends to a distal end 210 spaced from the rim 52 of the burner pipe 54 across a spark gap 212. A bend 214 in the electrode 202 lowers its distal end 210 to a position closer to the rim 52. The burner pipe 54, by virtue of its electrical connection to the spark module, serves as a second electrode. The high-voltage pulse from the spark module creates a spark in the spark gap 212 to ignite the burner.

Another single-electrode spark unit 220 is shown in FIG. 20. The spark unit 220 differs from the spark unit 200 of FIG. 19 in that a spark gap 222 is formed between the distal end 224 of a single electrode 226 and a protrusion 228, or horn, at the ends of a mounting bracket 230 attached to the spark unit's housing 231 and to the burner pipe 54. The spark gap 222 is positioned in the gas flow above the burner pipe's rim 52. While the spark unit 200 of FIG. 19 requires electrodes 202 of different lengths to provide proper spark gaps to burner pipes 54 of different diameters, the spark unit 220 of FIG. 20 accommodates burner pipes of any diameter with a single electrode length because the spark gap 222 is set by the spark unit itself. In the version shown in FIG. 20, the horizontal arm 232 of the electrode 226 is not bent downward at the distal end 224, and the protrusion 228 from the bracket 230 is bent upward toward the electrode's distal end to form the spark gap 222. But the distal end 224 of the electrode 226 could be bent downward, and the protrusion 228 could be formed with or without an upward bend to form the spark gap.

What is claimed is:

1. An igniter comprising:

a spark module including a receiver and a battery serving as the sole electric power source for the spark module;

a spark unit including at least one electrode having a distal end, wherein the at least one electrode is electrically connected to the spark module;

a sending unit remote from the spark module and having a transmitter and an actuator that, when actuated, causes the transmitter to send an ignite signal to the receiver for the spark module to send a high-voltage pulse to the at least one electrode to generate a spark at the distal end;

wherein the spark module includes an enclosure housing the battery and the receiver;

wherein the enclosure has a first enclosure portion forming a first channel portion along its length and a second enclosure portion including a clamp and forming a second channel portion along its length and wherein the second enclosure portion is separable from the first enclosure portion to admit a gas hose into the first channel portion and wherein the second enclosure portion is joined to the first enclosure portion with the gas hose received in the second enclosure portion and clamped by the clamp against the first enclosure portion.

2. The igniter of claim 1 wherein the actuator is a pushbutton on the sending unit.

3. The igniter of claim 1 wherein the spark module includes a receiver on/off pushbutton that, when depressed for a predetermined time period, enables the receiver if disabled and disables the receiver if enabled.

4. The igniter of claim 1 wherein the spark unit includes a pair of electrodes spaced apart at their distal ends across a spark gap and wherein the spark module includes an ignite pushbutton that, when actuated, causes the spark module to produce a high-voltage pulse across the electrodes to generate a spark in the spark gap.

5. The igniter of claim 1 wherein the spark unit has a single electrode electrically connected to the spark module.

6. The igniter of claim 1 comprising a regulator and wherein the sending unit is unitarily formed with the regulator.

7. The igniter of claim 1 wherein the spark unit includes a first connector and wherein the spark module includes a second connector that mates with the first connector to electrically connect the at least one electrode to the spark module and wherein the spark module includes a safety switch in the second connector that disables the spark module from generating the high-voltage pulse when the first connector is not mated with the second connector.

8. An igniter comprising:

a spark unit including at least one electrode having a distal end;

a spark module including:

a high-voltage pulse generator connected to the at least one electrode;

a sending unit including an actuator that, when actuated, causes the sending unit to send an ignite signal to the high-voltage pulse generator to send a high-voltage pulse to the at least one electrode to generate a spark at the distal end;

a battery providing all the electrical power to the spark module over a power line;

an enclosure housing the high-voltage pulse generator, the sending unit, and the battery;

wherein the enclosure has a first enclosure portion forming a first channel portion along its length and a second enclosure portion forming a second channel portion along its length and wherein the first and second channel portions form a channel through the enclosure and wherein the second enclosure portion is separable from the first enclosure portion to admit a gas line into the channel and wherein the second enclosure portion is joined to the first enclosure portion to retain the gas line in the channel.

9. The igniter of claim 8 wherein the actuator is a pushbutton on the spark module.

10. The igniter of claim 8 wherein the spark unit includes a first connector and wherein the spark module includes a second connector that mates with the first connector to electrically connect the at least one electrode to the high-voltage pulse generator and wherein the spark module includes a safety switch in the second connector that disables the high-voltage generator when the first connector is not mated with the second connector.

11. The igniter of claim 8 wherein the spark unit includes a first connector and wherein the spark module includes:

a second connector that mates with the first connector to electrically connect the at least one electrode to the spark module;

a safety switch in the second connector in line with the power line that opens the power line to unpower the spark module when the first connector is not mated with the second connector.

12. The igniter of claim 8 wherein the spark module comprises:

electronic circuitry within the enclosure and powered by the battery to control the high-voltage pulse generator;

wherein the electronic circuitry and the high-voltage pulse generator are potted within the enclosure.

13. The igniter of claim 8 wherein the spark unit includes an electrically non-conductive housing through which the at least one electrode extends from a base end within the housing to a distal end outside the housing.

14. The igniter of claim 8 wherein the spark unit comprises:

a first ceramic insulator and a second ceramic insulator, each having a first end and a second end;

a first electrode extending from the second end of the first ceramic insulator to a distal end;

a second electrode extending from the second end of the second ceramic insulator to a distal end;

an electrically non-conductive housing extending from a first housing end to a second housing end and molded over the first and second ceramic insulators;

wherein the first and second electrodes extend through the housing from the first housing end and through the second housing end to the distal ends;

wherein the housing includes insulating spacers at the second housing end molded over the first and second electrodes along a length of the first and second electrodes extending from the second housing end to prevent liquid from entering the housing at the second end.

15. A cooking system comprising:

a burner having a gas outlet;

a gas hose carrying gas to the burner;

an igniter including:

a spark unit attached to the burner and including at least one electrode having a distal end at the gas outlet of the burner;

a spark module including:

a high-voltage pulse generator electrically connected to the at least one electrode and sending a high-voltage pulse to the at least one electrode to generate a spark that ignites the gas flowing through the outlet;

a battery providing all the electrical power to the spark module;

an enclosure housing the high-voltage generator and the battery;

a bracket fastened to the spark unit and having a hook at one end that hooks over the burner at the gas outlet;

a set screw through the bracket that tightens the hook against the burner to set the position of the distal end at the gas outlet of the burner.

16. The cooking system of claim 15 wherein the enclosure has a first enclosure portion forming a first channel portion along its length and a second enclosure portion including a clamp and forming a second channel portion along its length and wherein the second enclosure portion is separable from the first enclosure portion to admit the gas hose into the first channel portion and wherein the second enclosure portion is joined to the first enclosure portion with the gas hose received in the second enclosure portion and clamped by the clamp against the first enclosure portion.

17. The cooking system of claim 15 wherein the battery supplies power to the spark module over a power line and wherein the spark unit includes a first connector and wherein the spark module includes:

a second connector that mates with the first connector to electrically connect the electrodes to the spark module;

a safety switch in the second connector in line with the power line that opens the power line to unpower the spark module when the first connector is not mated with the second connector.

18. The cooking system of claim 15 wherein the bracket includes a lower segment fastened to the spark unit, an upper segment that terminates in the hook and through which the set screw is threaded, and an intermediate segment obliquely joined to the upper and lower segments to offset the upper segment from the lower segment.

19. The cooking system of claim 15 comprising a sending unit remote from the spark module and having an actuator that, when actuated, causes the sending unit to send an ignite signal to the spark module for the high-voltage pulse generator to send a high-voltage pulse to the at least one electrode to generate a spark at the gas outlet of the burner.

20. The cooking system of claim 15 wherein the spark unit includes:

a pair of electrodes;

a pair of ceramic insulators, each extending from a first end to a second end and associated with one of the electrodes;

wherein the electrodes extend through the second ends of the ceramic insulators to distal ends.

21. The cooking system of claim 15 wherein the spark module includes a fastener that is an elastic-band fastener or a hook-and-loop strap fastener that wraps around the gas hose.

22. A cooking system comprising:

a burner having a gas outlet;

a gas hose carrying gas to the burner;

an igniter including:

a spark unit attached to the burner and including:

a single electrode having a distal end at the gas outlet of the burner;

a first connector;

a first wire electrically connected at one end to the single electrode;

a second wire electrically connected at one end to the burner;

wherein the other ends of the first and second wires are connected to the first connector;

a spark module including:

a high-voltage pulse generator electrically connected to the single electrode;

a battery providing all the electrical power to the spark module;

an enclosure housing the high-voltage generator and the battery;

wherein the spark module has a second connector that mates with the first connector; and wherein the high-voltage pulse generator applies a high-voltage pulse across the first and second wires through the first and second connectors to generate a spark between the distal end of the single electrode and the burner at the gas outlet to ignite the burner.

23. The cooking system of claim 22 comprising a bracket attaching the spark unit to the burner and wherein the second wire is electrically connected to the burner through a physical connection to the bracket.

24. The cooking system of claim 22 wherein the spark module includes a fastener that is an elastic-band fastener or a hook-and-loop strap fastener that wraps around the gas hose.

* * * * *